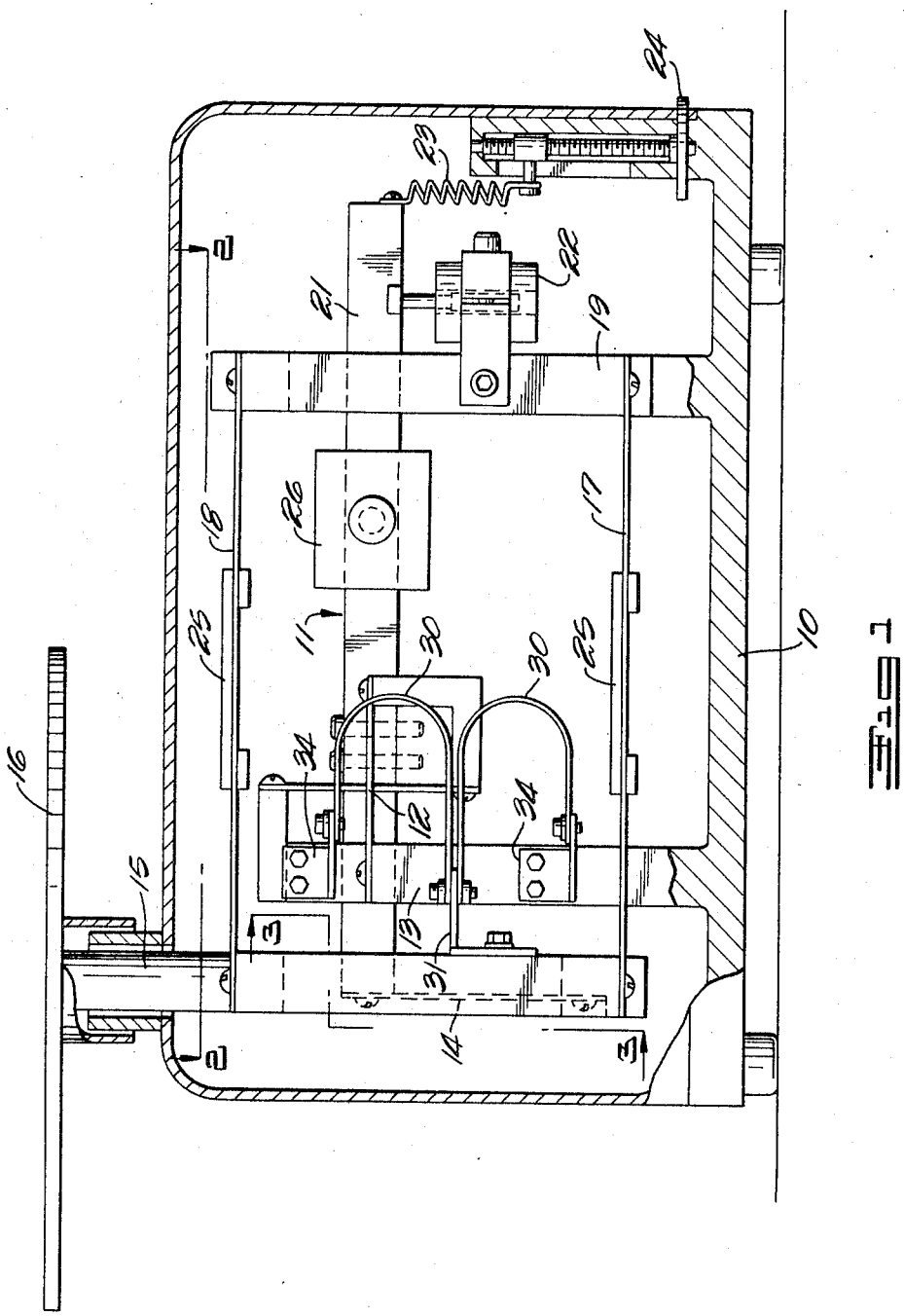

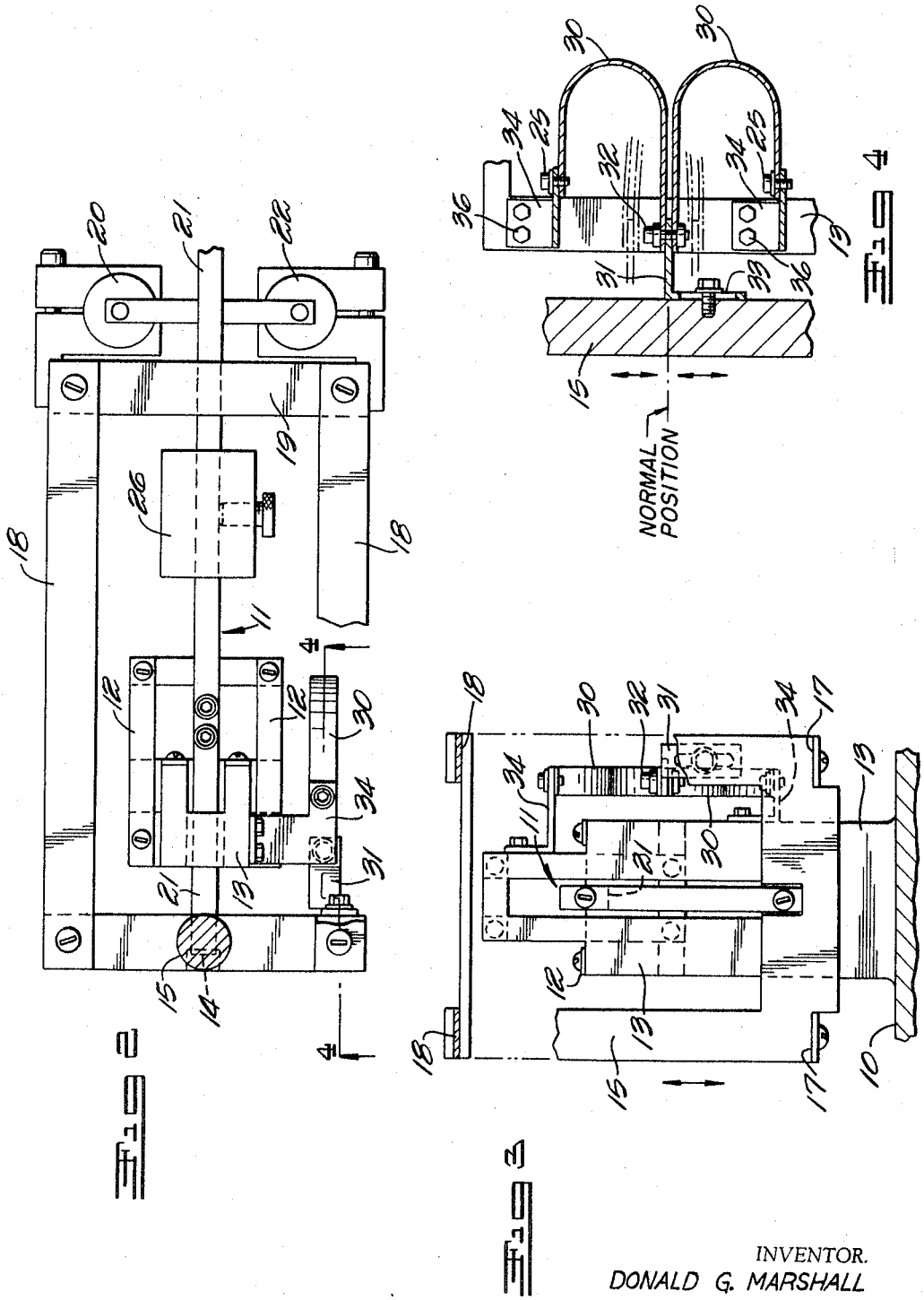

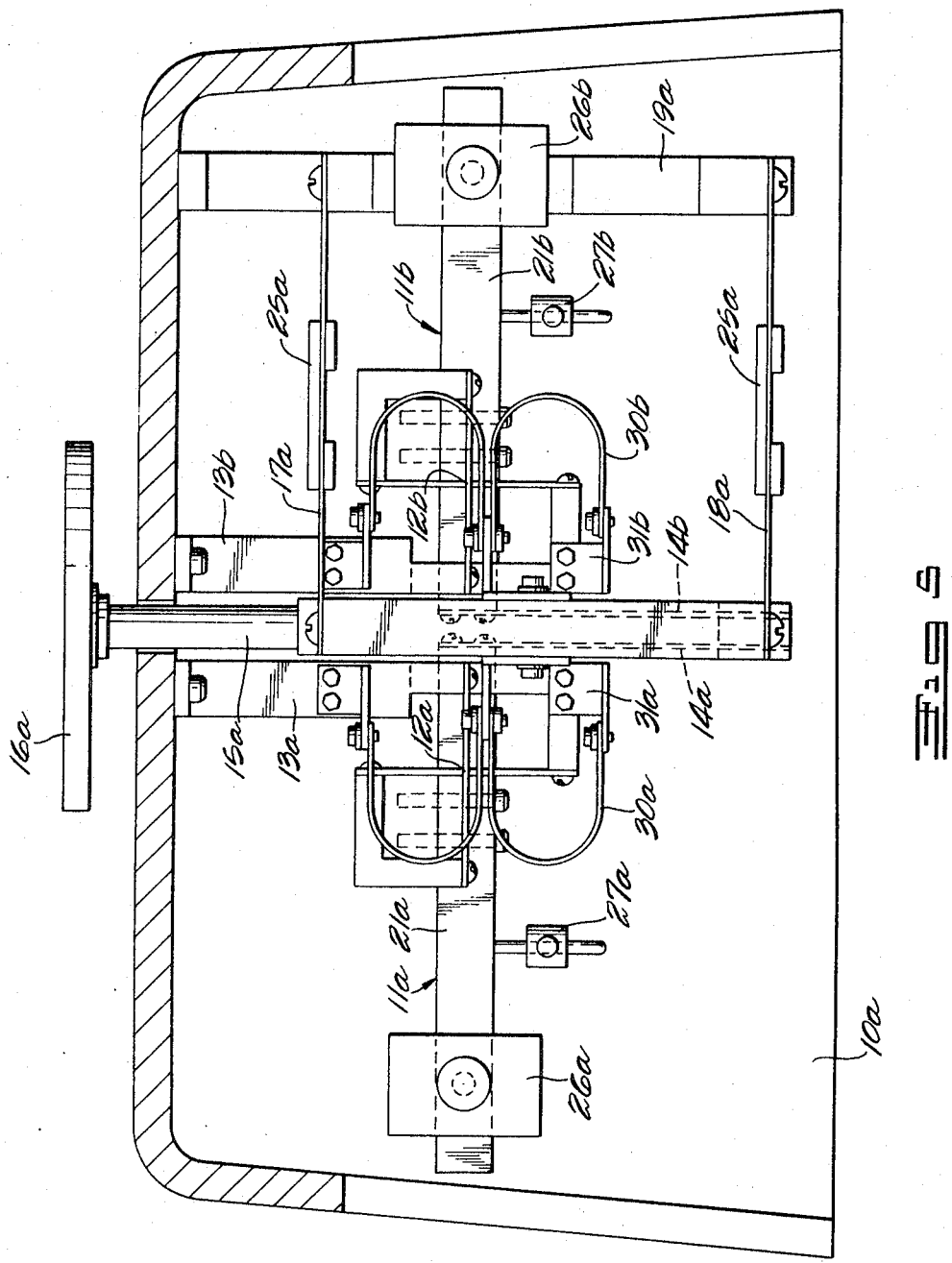

3,443,653
WEIGHING SCALE

Donald G. Marshall, Columbus, Ohio, assignor to Exact Weight Scale Corporation, Columbus, Ohio, a corporation of Ohio
Filed June 21, 1967, Ser. No. 647,786
Int. Cl. G01g 3/08
U.S. Cl. 177—225      6 Claims

ABSTRACT OF THE DISCLOSURE

A weighing scale comprising a weighing lever supported for weighing movement by fulcrum means including crossed resilient flexures connected between the lever and a support, to permit movement of the lever relative to the support in response to weight applied to the lever, in combination with a resilient flex loop arrangement for resisting movement of said lever. The resilient flex loop arrangement comprises resilient flexes bent into U-form and arranged in pairs with the loop of each pair opposing and balancing each other, each loop having one end connected to a fixed support and the other end operatively connected to the lever.

---

This invention is an improvement on the weighing scale disclosed in the copending application of Schieser et al., Ser. No. 487,551, filed Sept. 15, 1965, Patent No. 3,347,-328.

The weighing scale disclosed in said copending application uses crossed flexures arrangements to reject all disturbances of all frequencies to keep them out of the scale and thereby ensure its accuracy even under various conditions of shock. The present invention employs a flex loop arrangement in combination with the flexure arrangement disclosed in said application and this arrangement produces the following advantages:

(1) It allows for quick and easy change of weight range for a given lever fall.

(2) Makes scale working range much larger than before possible.

(3) Makes the range of weight on the dial (meter readout also) larger and still remains lineal.

(4) Allows for field change of scale sensitivity or travel so scale may be adapted to changes in job specifications.

(5) Makes it possible to have a large working range without introducing any unbalance in the flexure system.

BRIEF DESCRIPTION OF DRAWINGS

In the accompanying drawings, there are illustrated examples of embodiments of the present invention but it is to be understood that specific details of structure may be varied without departing from basic principles of the invention.

In these drawings:

FIGURE 1 is a view mainly in vertical longitudinal section of a weighing scale of the single lever system type embodying this invention.

FIGURE 2 is a horizontal sectional view taken along line 2—2 of FIGURE 1.

FIGURE 3 is a transverse vertical sectional view taken along line 3—3 of FIGURE 1.

FIGURE 4 is a detail in longitudinal vertical section taken on line 4—4 of FIGURE 2 showing the flex loop arrangement.

FIGURE 5 is a view in vertical longitudinal section similar to FIGURE 1 but showing the invention applied to a weighing scale having double lever systems.

DETAILED DESCRIPTION OF DRAWINGS

With reference to the drawings, the scales disclosed therein are in general structure similar to those disclosed in said copending application but have the improvements of this present invention applied thereto.

Thus, in FIGURE 1, there is disclosed a scale of the single lever system type in which the base 10 supports a single lever system 11. This lever system is mounted on the crossed resilient flexures 12 which are carried by a support 13 upstanding from the base. One end of the lever system is connected by a push-pull strap 14 to an outrider 15 which carries a commodity platform 16. The outrider 15 is carried by the pairs of lower and upper stabilizing flexures 17 and 18, as shown in FIGURES 1 and 2, which are anchored to the rigid support 19 that is upstanding from the base 10 at a location spaced longitudinally from the support 13. A dashpot 20 (FIGURE 2) may be connected to the end of the lever bar 21 which is opposite the outrider end. A signal producing means which signals overweight or underweight of the lever 21 may be operatively connected thereto and may be in the form of a transformer 22 (FIGURE 2). Also, this end of the lever bar may have a balancing spring 23 connected thereto which is adjustable by means of an adjusting knob 24. The spring 23 will aid in minimizing the effects of unequal masses when the unit is subject to external disturbances. To control the effective length of the stabilizer flexures 17 and 18, stiffener clamps 25 may be applied respectively thereto intermediate the lengths thereof. A weight 26 may also be provided for adjustment along the lever bar 21 to obtain a neutral or balanced position with a predetermined weight of article or commodity on the platform 16. As indicated in said copending application, because this arrangement provides for equal masses above and below the fulcrum 12 and to the right and left of the fulcrum and since the fulcrum is along the range line of the lever bar 21, disturbance forces directed in vertical and horizontal planes will be rejected by this unit.

Assuming the scale has been balanced for a predetermined weight to be checked and the tare has been balanced out of the mechanism, the weighing scale is now ready to function in the weighing operation. If a commodity or an article of the predetermined weight is placed on the platform 16, there will be no movement of the lever system 11. However, if the weight of the article is over or under the predetermined amount, the lever system will be actuated to indicate whether the article is underweight or overweight.

However, to resist movement of the lever system away from balanced or neutral position and to restore it to such position when the unbalancing force is removed, to obtain various advantages, a resilient flex loop arrangement is provided, according to this invention, for cooperating with the flexure arrangement described above. This flex loop arrangement is indicated in FIGURES 1 to 4. It comprises resilient flex loops 30 of U-form which are arranged in a pair, the loops opposing and balancing each other. Each loop has one end connected to a fixed support and its opposite end operatively connected to the lever bar. In the example illustrated, one end of each loop 30 is anchored to the fixed support 13 and its opposite end is connected to the outrider 15, which, in turn, is connected by the member 14 to the lever bar 21.

The connection and action of the loops 30 is illustrated best in FIGURE 4. It will be noted that the flexibly resilient loops 30 are disposed in superimposed position with their open ends directed toward the outrider 15. The two adjacent inner legs are, in normal position, disposed in horizontal parallel position and their free ends are disposed above and below the horizontal portion of an angle bracket 31 to which they are connected by a clamp bolt 32. The vertical part of this bracket is connected to the outrider 15 for relative vertical adjustment by means of a bolt and slot connection 33. The other horizontally disposed leg of each loop 30, that is, the upper leg of the upper loop 30 and the lower leg of the lower loop 30, is connected to an adjacent one of the angle brackets 34 by means of a screw 25. These brackets are rigidly fixed to the support 13 by means of the bolts 36.

The vertically stacked loops 30 are thus so arranged that they oppose and balance each other and normally tend to keep the lever bar 21 in neutral or balanced position, being connected thereto through the outrider 15. Any force tending to move the outrider downwardly will be resisted by the lower flex 30 whereas any force tending to move the outrider upwardly will be resisted by the upper flex 30, as indicated in broken lines in FIGURE 4. As soon as the unbalancing force is removed, the opposed loops 30 will act to restore the lever bar 21 to neutral or balanced position.

The commodity platform 16 is given as an example only and instead of a platform, a receiving pan, hopper, or other container or support may be provided for receiving and supporting the material or article during weighing or check-weighing. Also, various signaling means may be provided for indicating overweight or underweight, such as that disclosed in the patent to Schieser No. 2,568,255, and may be an electronic system including the transformer 22 previously mentioned. Also, if desired, indicating mechanism with a visible dial (not shown) may be connected to the lever system 12 for indicating the movement of the mechanism away from or toward balanced or neutral position. A type of indicating mechanism suitable for this purpose is illustrated in the patent to Schieser No. 8,822,577.

In FIGURE 5, there is illustrated a double lever system similar to that disclosed in said copending application and to which the present invention is applied. These lever systems are indicated generally at 11a and 11b and are shown within a base housing 10a. The two lever systems are identical except that they are allochiral. A commodity outrider 15a is connected to the two lever systems and may carry a platform 16a. The outrider 15a is mounted for vertical movement on the pairs of upper and lower stabilizer flexures 17a and 18a, respectively. The inner end of each flexure is attached to the outrider 15a and its outer end is attached to the support 19a depending from the housing 10a. The flexures 17a and 18a carry the stiffener clamps 25a.

Thus, the outrider 15a is supported for vertical movement of the platform 16a created as a result of the application of a weight thereto of greater or lesser amount than the commodity or article weight for which the scale is balanced. The lever systems 11a and 11b are operatively connected to the outrider 15a to provide a preselected resistance to movement of the platform 16a from a predetermined balanced position. Crossed flexures 12a and 12b, of the type disclosed in said copending application, form a part of the respective lever systems 11a and 11b and offer resistance to movement of the levers of the systems away from a predetermined balanced condition.

The resilient flexures 12a and 12b support the respective lever bars 21a and 21b for vertical swinging movement about the fulcrum points formed where the flexures cross. The inner ends of the respective lever bars 21a and 21b are connected by the push-pull strips 14a and 14b to the commodity outrider 15a. The respective lever bars 21a and 21b carry the adjustable weights 26a and 26b and may also carry the adjustable tare weights 27a and 27b.

As pointed out in said copending application, this scale is of such structure that it rejects all disturbances at all frequencies. This is true of disturbances resulting from horizontal or vertical shock or a combination thereof.

In this example also, there is provided in association with each lever system 11a and 11b, a resilient flex loop arrangement to resist movement of the levers away from balanced condition and to restore them to balanced position whenever the unbalancing force is removed. These arrangements are indicated at 30a and 30b, respectively, in FIGURE 5. Each arrangement is identical with that described in detail with refernce to the scale of FIGURE 1 and, therefore, the description need not be repeated in detail. Here again the U-shaped resilient flex loops are connected between the movable outrider 15a and a fixed support which takes the form of the rigid supports 13a and 13b depending from the housing 10a. In this example, as before, the brackets 31a and 31b, are connected by a vertically adjustable connection to the outrider 15a.

The opposed loops 30a or 30b will cooperate with the respectively associated lever bars 21a and 21b exactly as before. They normally tend to keep the lever bar in neutral or balanced position and will restore it to such position after any unbalancing force is removed.

SUMMARY OF ADVANTAGES

It will be apparent that the resilient flex loops of this invention in combination with the crossed resilient flexure fulcrums, have many advantages. With this arrangement, quick and easy change of weight range is permitted for a given lever fall by variations in length of the flexes of the loops. The working range of the scale is increased by the increased resistance provided by the loops. The flex loops may be readily removed and replaced with loops of different sizes or the effective length of the loops may be adjusted by releasing its support connections and adjusting its length. Also, the adjustable bracket which connects each loop to the outrider is adjustable to obtain uniform travel of the lever on each side of the balance position. Small adjustments of the bracket can be made to vary the effect of the loop, by adjusting its ends toward or away from each other, without loosening its connections and varying its length. The use of the loops with the crossed flexure fulcrum makes it possible to change the restoring force of the scale with ease without exceeding the elastic limits of the crossed flexes. This overcomes the difficulty encountered with the crossed flexure scale where a change in the restoring force was very difficult and time-consuming, requiring disassembling and rebuilding with all adjustments for lever length that are required to build a new scale. With the loop flex, in combination with the crossed flexures, no adjustments to the main section of the scale are needed, only the loop flex must be adjusted to give a balance of force. This makes field changes of scale sensitivity readily feasible. The loop arrangement makes it possible to have a scale with a large working arrangement without introducing any unbalance in the flexure system. Furthermore, indicating mechanism may be provided in association with the levers, having the loop arrangements connected thereto, and this mechanism may include dials (or meter readout) with a wide range of lineal weight indication.

Various other advantages will be apparent.

Having thus described this invention, what is claimed is:

1. A weighing scale comprising a weighing lever, means for supporting the lever for weighing movement, said means including crossed resilient flexures connected between the lever and a support to provide a fulcrum to permit movement of the lever relative to the support away from a balance position in response to weight applied to the lever, said crossed flexures providing a fulcrum axis at the point of crossing of the flexures, and a resilient flex loop arrangement for resisting movement of said lever, said resilient flex loop arrangement comprising resilient flexes bent into U-form and arranged in a pair with the loops of the pair opposing and balancing each other, one end of each loop being connected to a fixed support and the other end being operatively connected to said lever.

2. A weighing scale according to claim 1 including an adjustable connection at the end operatively connected to said lever for adjusting the ends of the loop toward or from each other.

3. A weighing scale according to claim 1 in which said scale includes an outrider element, flexures for supporting said outrider element for movement, push-pull means connecting said outrider with said lever so that movement of the outrider will move said lever away from balance position, said end of each of said loops which is operatively connected to the lever being connected thereto through said outrider.

4. A weighing scale according to claim 3 in which said end of the loop is connected to the outrider by means including an adjustable connection for varying the relative spacing of the ends of the loop.

5. A weighing scale according to claim 4 in which the fulcrum provided by said crossed flexures is located intermediate the length of said U-form loops.

6. A weighing scale according to claim 5 in which said flexures which support said outrider are substantially at right angles to the axis of the outrider and are substantially parallel to the axis of the lever when the lever is in balance position.

References Cited

UNITED STATES PATENTS

| | | | |
|---|---|---|---|
| 2,074,983 | 3/1937 | Flanagan | 177—195 |
| 2,692,772 | 10/1954 | Hadley | 177—195 XR |
| 3,347,328 | 10/1967 | Schieser et al. | 177—229 |
| 3,371,731 | 3/1968 | Conners et al. | 177—225 |

ROBERT S. WARD, JR., *Primary Examiner.*

LAWRENCE H. HAMBLEN, *Assistant Examiner.*

U.S. Cl. X.R.

177—169, 231, 255, 229